Nov. 24, 1959  E. SORENSEN ET AL  2,914,252
WATER DISPENSING EQUIPMENT
Filed Oct. 23, 1957  5 Sheets-Sheet 1

INVENTORS
EGON SORENSEN
EARL A. GOTT
WILLIAM J. HAYES

*F. J. Pisarra*
ATTORNEY

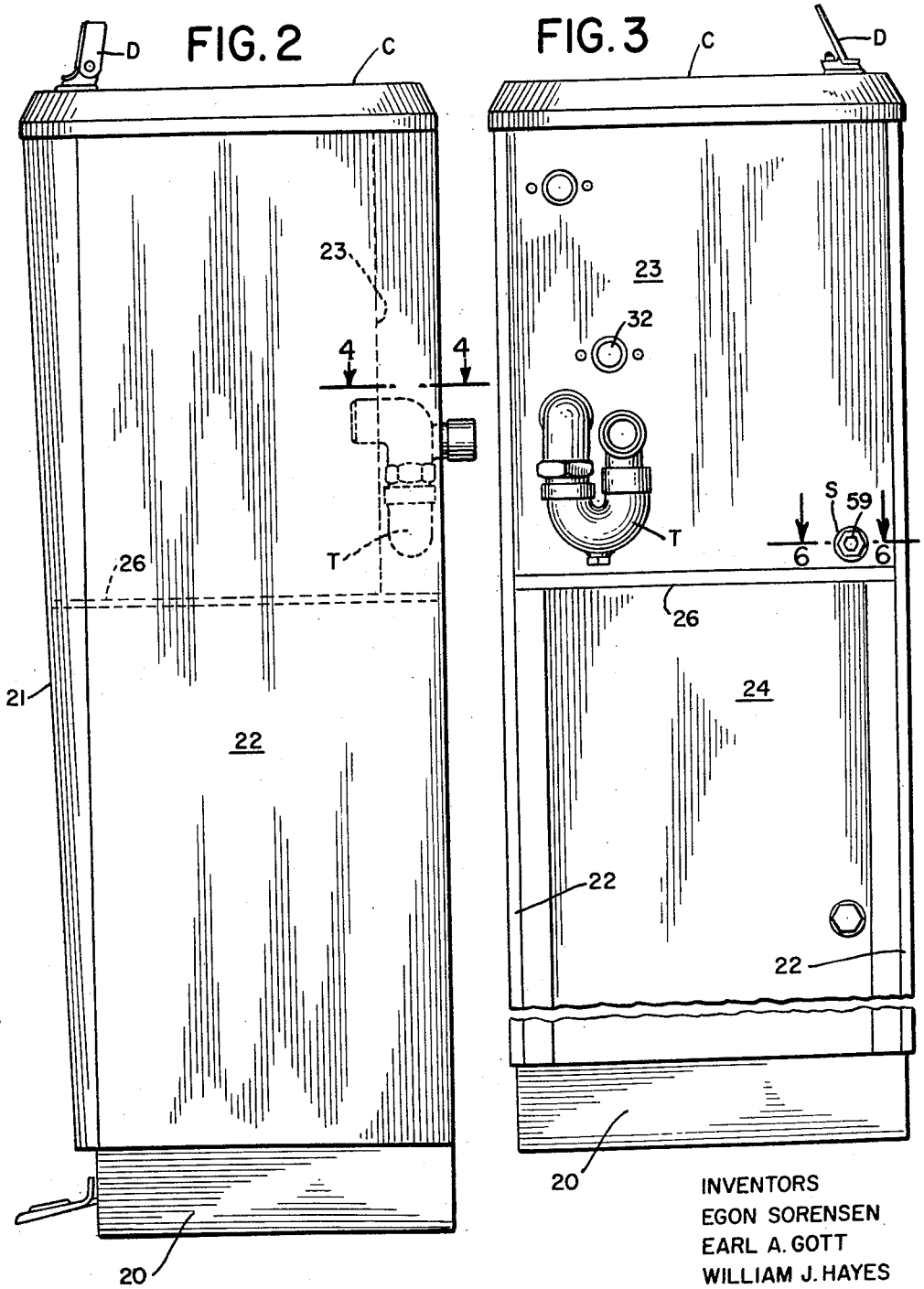

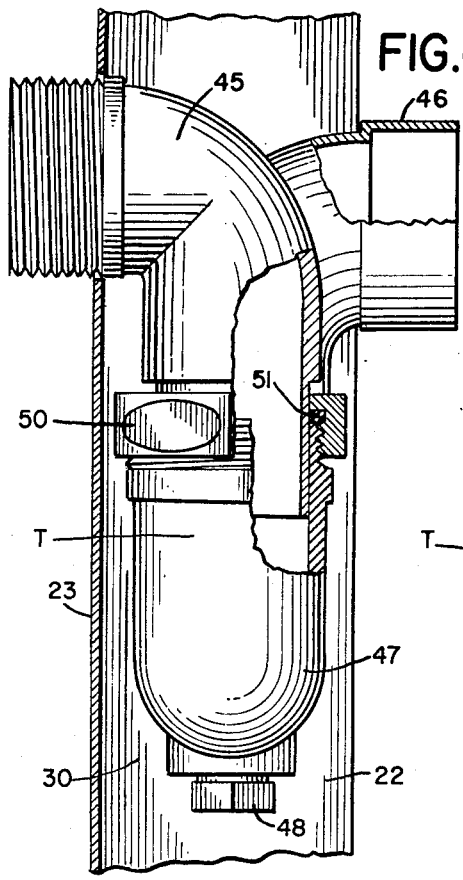
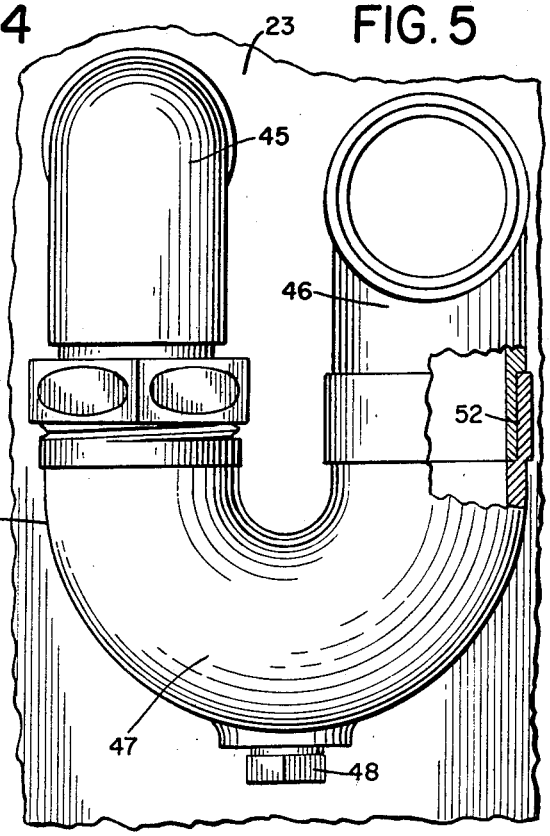
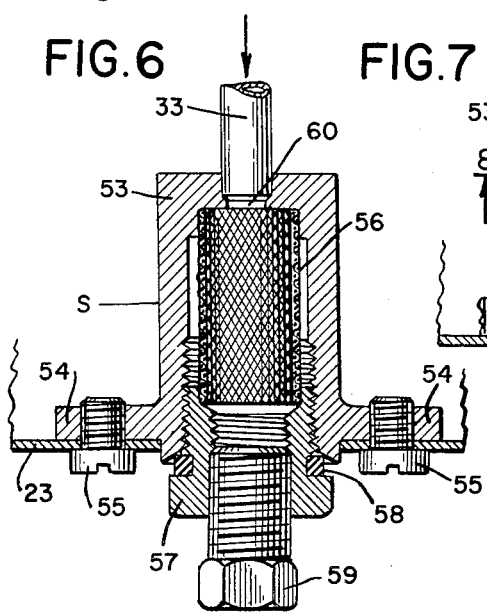
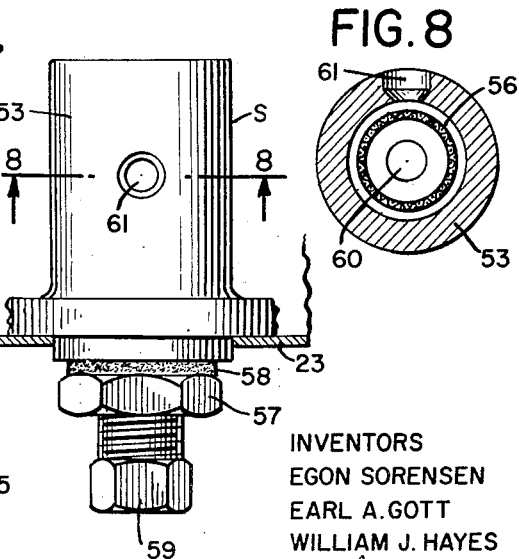
INVENTORS
EGON SORENSEN
EARL A. GOTT
WILLIAM J. HAYES
ATTORNEY Nov. 24, 1959  E. SORENSEN ET AL  2,914,252
WATER DISPENSING EQUIPMENT
Filed Oct. 23, 1957  5 Sheets-Sheet 4
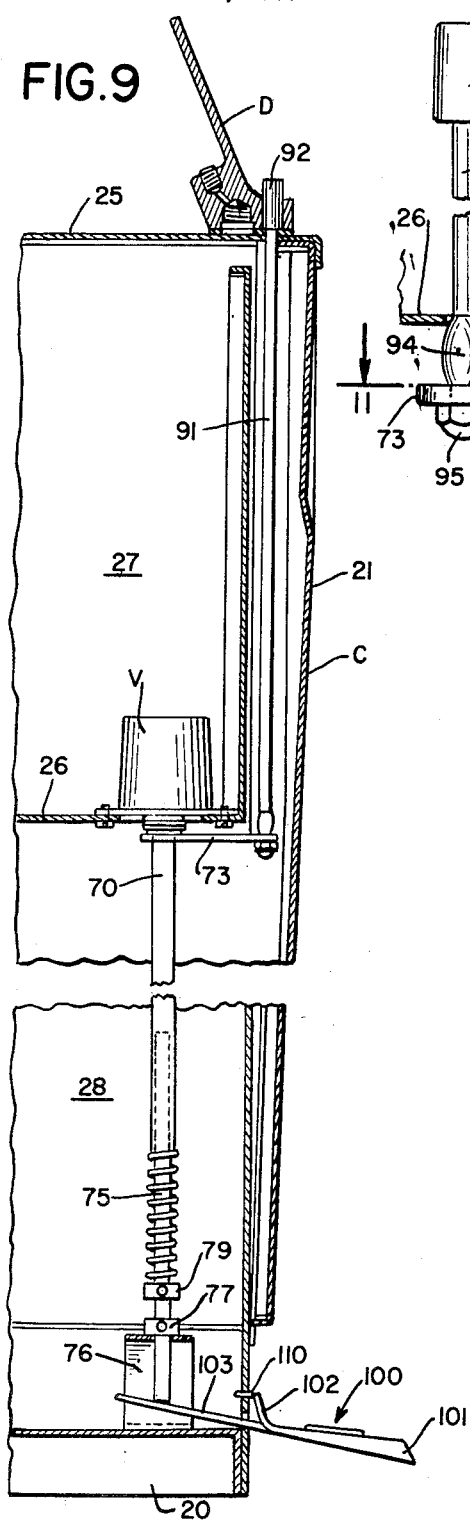
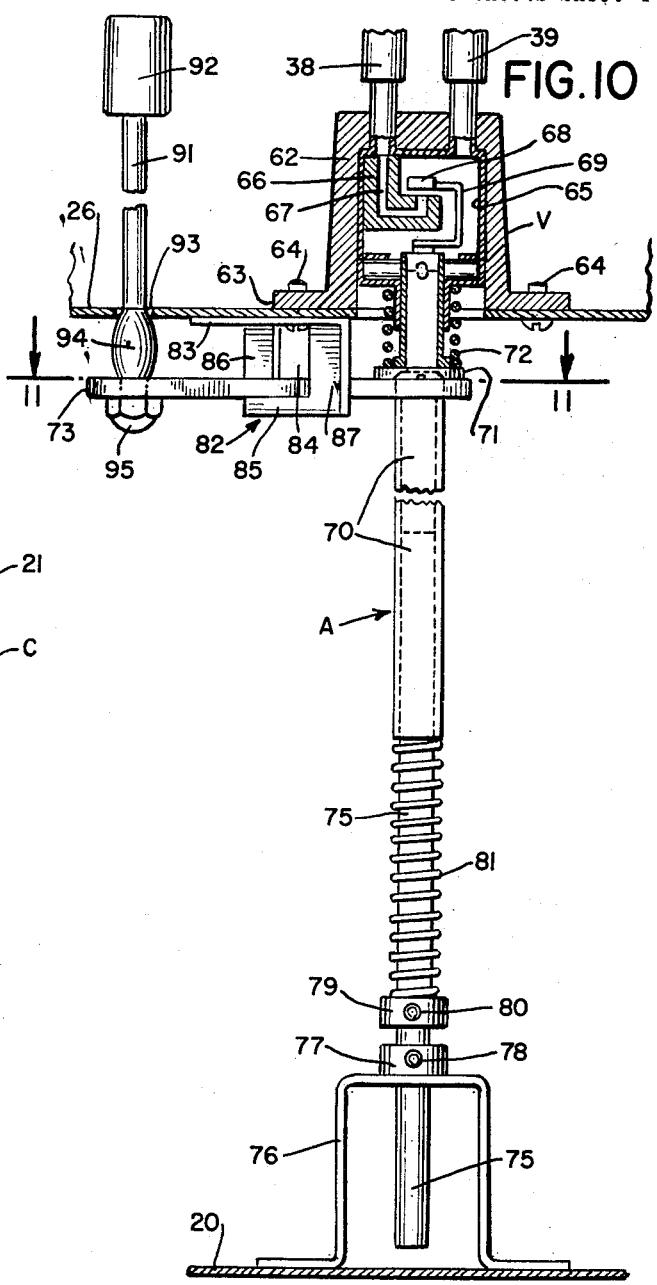
INVENTORS
EGON SORENSEN
EARL A. GOTT
WILLIAM J. HAYES
ATTORNEY Nov. 24, 1959
E. SORENSEN ET AL
2,914,252
WATER DISPENSING EQUIPMENT
Filed Oct. 23, 1957
5 Sheets-Sheet 5
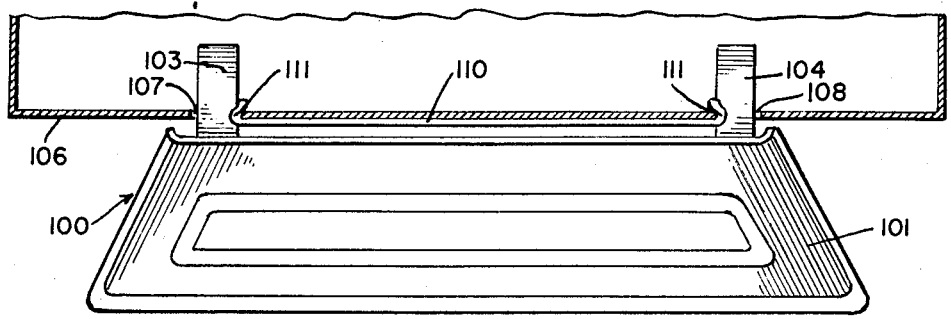
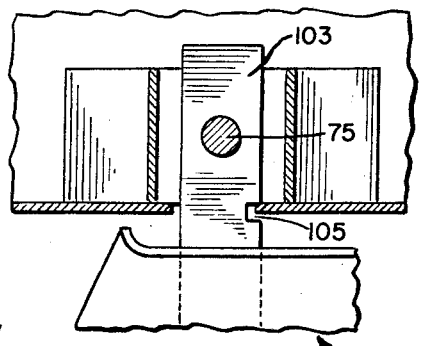
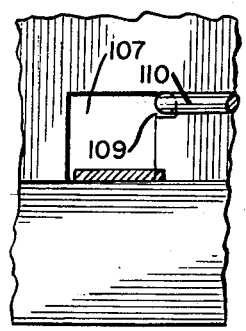
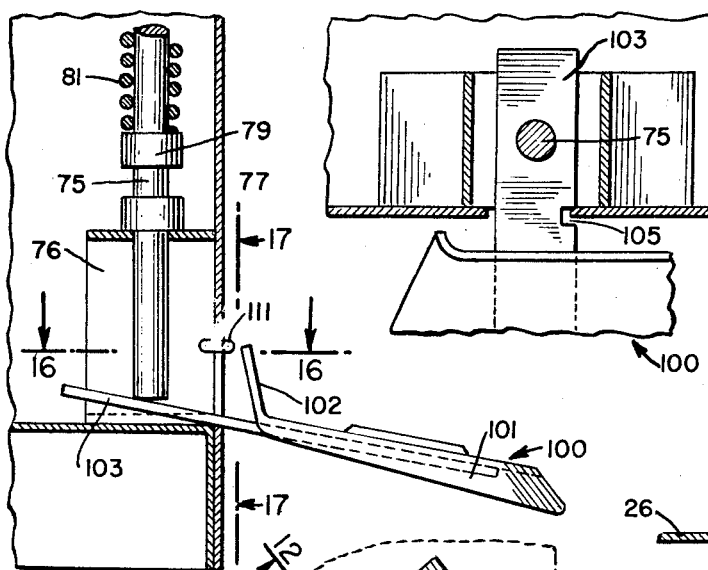
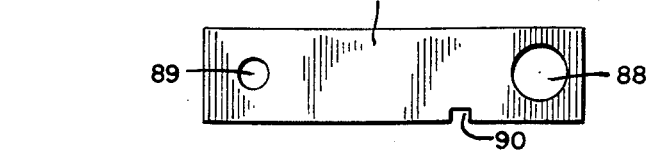
INVENTORS
EGON SORENSEN
EARL A. GOTT
WILLIAM J. HAYES
*F. J. Pisarra*
ATTORNEY

United States Patent Office 2,914,252
Patented Nov. 24, 1959

2,914,252

WATER DISPENSING EQUIPMENT

Egon Sorensen, Glen Riddle, Earl A. Gott, Drexel Hill, and William J. Hayes, Glen Riddle, Pa., assignors to Sunroc Corporation, Glen Riddle, Pa., a corporation of Delaware Application October 23, 1957, Serial No. 691,945

6 Claims. (Cl. 239—29)

This invention relates to the art of dispensing water. The invention pertains, more particularly, to improved devices and arrangements of devices that may be advantageously employed in water dispensing equipment of the type that includes a cabinet in which certain of the parts are housed.

This invention includes a number of novel and unique features. Among such features are (a) a simple, compact and reliable water strainer, (b) an improved valve actuating means for controlling discharge of water and (c) a concealed water trap that is so constructed and arranged that it is positioned substantially wholly within the cabinet thereby minimizing the amount of space which is required between the rear of the cabinet and a room wall. These and other features of the invention will be readily apparent to persons trained in the art from the detailed description appearing further along herein taken in conjunction with the drawings.

It is the primary object of this invention to provide water dispensing equipment having unique, improved and simplified features of design and construction.

Another object of the invention is to provide an improved strainer for water dispensing equipment.

Another object of the invention is to provide improved valve actuating means for controlling emission of water from water dispensing equipment, the valve actuating means including a foot pedal that is sturdy in construction; that may be readily engaged by the foot of a user; that may be quickly and easily installed or removed, as required; and that may be raised to a position to permit cleaning therebeneath without detaching from the cabinet.

A further object of the invention is to provide water dispensing equipment which includes a water trap that is positoned substantially wholly within the equipment cabinet, whereby the trap is concealed from view and the equipment may be installed close to a room wall with a minimum amount of space between the rear of the cabinet and such wall.

The invention has for a still further object the provision of water dispensing equipment which is simple, compact and attractive in design; which is sturdy and durable in construction; which is reasonable in manufacturing, installation and maintenance costs; and which is capable of performing its intended functions in a satisfactory manner.

With the above and other objects in view, the invention comprises the devices, combinations and arrangements of parts set forth in the following detailed description and illustrated in the accompanying drawings of a preferred construction embodying the invention, from which the several features of the invention, together with the advantages attainable thereby, will be readily understood by persons skilled in the art.

In the drawings wherein like reference characters denote corresponding parts throughout the several views:

Fig. 2 is a view in side elevation of a cabinet that contains the water dispensing equipment shown in Fig. 1 and in other views;

Fig. 3 is an elevation view of the back of the cabinet shown in Fig. 2, as observed from the right of Fig. 2;

Fig. 4 is an enlarged fragmentary view taken below line 4—4 of Fig. 2 and illustrates the relative position of the parts of a water trap with respect to certain cabinet parts;

Fig. 5 is an elevation view taken from the right of Fig. 4;

Fig. 6 is a central longitudinal cross sectional view through a strainer unit that constitutes one of the devices of the water dispensing equipment;

Fig. 7 is an elevation view of the strainer unit shown in Fig. 6;

Fig. 8 is a view taken along line 8—8 of Fig. 7;

Fig. 9 is a vertical cross sectional view through a portion of the cabinet of Figs. 2 and 3 and illustrates apparatus for controlling dispensing of water by the equipment;

Fig. 10 is an enlarged view of a portion of Fig. 9;

Fig. 11 is a view taken along line 11—11 of Fig. 10;

Fig. 12 is a view taken along line 12—12 of Fig. 11;

Fig. 13 is a top plan view of a plate element that is shown in other views including Fig. 11;

Fig. 14 is an enlarged horizontal cross sectional view through the base of the cabinet and shows a foot pedal associated therewith;

Fig. 15 is a view taken along line 15—15 of Fig. 14;

Fig. 16 is a view taken along line 16—16 of Fig. 15;

Fig. 17 is a view taken along line 17—17 of Fig. 16; and

Figure 1:
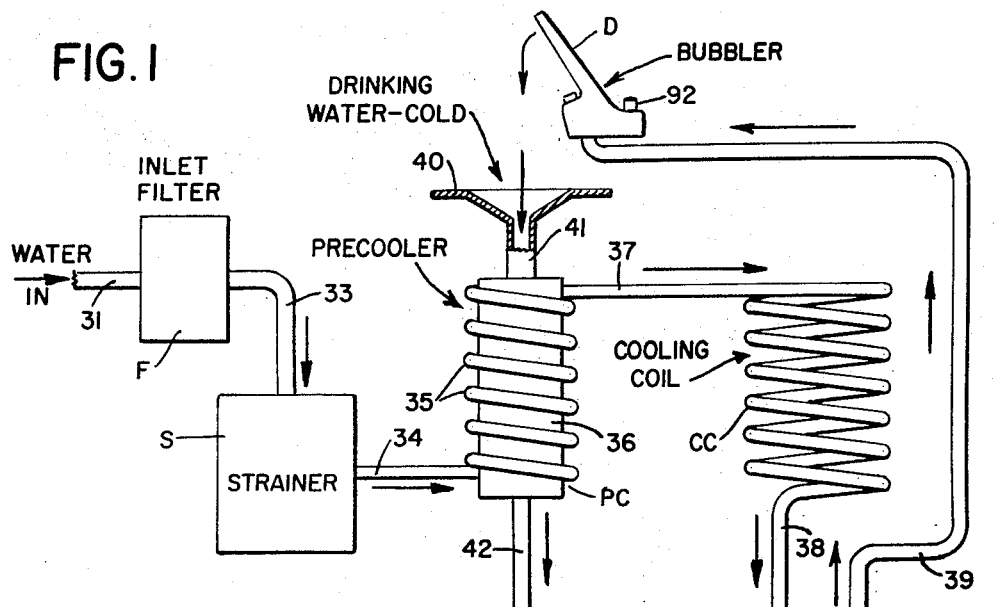
Fig. 1 is a combined flow diagram and schematic representation of water dispensing equipment constructed in accordance with this invention.

Referring initially to Figs. 2, 3 and 9, we have illustrated therein a water cooler cabinet C. The cabinet comprises a base 20, a front wall or panel 21 that is positioned forwardly of the base, a pair of spaced-apart side walls 22, a rear wall consisting of an upper panel 23 and a lower panel 24, and a top 25. A partition 26 extends across the interior of the cabinet and divides the same into an upper compartment 27 and a lower compartment 28 (Fig. 9). As is best shown in Figs. 2 and 4, panel 23 is positioned inwardly of the rear edges of the cabinet side walls, whereby this panel and the side walls define a recess 30.

Referring now to Fig. 1, water from a suitable source (not shown) is admitted into the cabinet by way of a conduit 31 through a connection 32 in rear wall panel 23 (Fig. 3) and passes through an inlet filter F. Water from the filter is admitted into a strainer S by way of a conduit 33 and is discharged from the strainer by a conduit 34 which communicates with a tubular coil 35 of a precooler unit PC. The precooler unit includes a receptacle 36 which is positioned within the confines of coil 35.

A conduit 37 establishes communication between the coil 35 and a water cooling coil CC which is an element of a refrigerating unit that is otherwise not shown. A conduit 38 connects the cooling coil to a regulating valve V. This valve is normally closed and is adapted to be actuated to open position by an actuating means A.

The outlet of the valve is connected to a water dispenser D by a conduit 39. The dispenser may consist of a conventional bubbler, as shown, or other device, such as goose-neck glass filler. A concave receptacle 40 in the cabinet top communicates with a conduit 41 that is connected to the upper end of receptacle 36. This receptacle is adapted to receive water emitted from the bubbler and transmit such water by a conduit 42 to a water trap T. The discharge end of the trap is removably connected to a discharge conduit 43. The water which passes through the precooler receptacle 36 is usually at a much lower temperature than the water in coil 35. As a consequence, the temperature of the water in coil 35 is lowered by heat exchange between the receptacle and that coil.

Trap T, as best shown in Figs. 4 and 5, comprises a pair of L's 45 and 46 and a U-tube 47 which is provided with a clean-out plug 48. The lower end of L 45 forms a slip fit with one end of the U-tube. This L is sealed to the U-tube by an internally threaded connector ring 50 and a flexible sealing ring 51, as illustrated in Fig. 4. The lower end of L 46 registers with the other end of the U-tube, as indicated at 52, and is joined thereto, preferably by soldering. It will be observed from an examination of the drawings that trap T is positioned substantially wholly within recess 30 at the rear of the cabinet. Moreover, the trap parts are so constructed and arranged that they require only a small amount of depth space within the cabinet. Further, the trap is concealed from view and minimizes the space that is usually required between the rear of the cabinet and a room wall.

The details of construction of strainer S are shown in Figs. 6, 7 and 8. It will be observed from an examination of these views that the strainer includes an inverted cylindrical housing 53 which has a pair of diametrically opposed ears 54 for attachment to rear wall panel 23 by screws 55. Positioned within housing 53 is a right circular cylindrical perforate strainer element 56 which is opened at its ends. The strainer element is maintained in the position shown in Fig. 6 by a bushing 57 which threadedly engages the open end of the housing. A sealing ring 58 prevents leakage between the bushing and the housing. The strainer is provided with a threaded plug 59 in bushing 58. The strainer has an inlet passage 60 in housing 53. This passage communicates with conduit 33. The strainer also has an outlet passage 61 which is adapted to communicate with conduit 34. It will be appreciated that the strainer may be readily assembled, mounted in position, dismantled, or serviced, as required. In fact, the strainer may be easily and quickly cleaned by removing plug 59 or bushing 38 from the rear of the cabinet without disturbing any of the devices that are housed in the cabinet.

Valve V includes a shell or housing 62 (Fig. 10) which has an outwardly extending circular flange 63 for attachment to partition 26 by screws 64. Contained within shell 63 is a regulator cartridge 65 that includes a body 66 having an L-shaped passage 67 which communicates at one end with conduit 38 and at its other end with the interior of the cartridge. A valve closure element 68 is affixed to an arm 69. A length of rectilinear tubing 70 is attached to the lower end of arm 69 and carries a collar 71. A helical compression spring 72 bears against cartridge 65 and collar 71 and normally and yieldingly urges tubing 70 and arm 69 in a downward direction to maintain valve element 68 in closed position. One end of a lever 73 engages collar 71, as shown.

Actuating means A includes a rod 75 which is slidable in tubing 70 and through the web of an inverted U-bracket 76. This rod carries a first collar 77 that is adjustably secured thereto by a set screw 78 and a second collar 79 that is adjustably secured thereto by a set screw 80. It will be observed that collar 77 limits downward movement of rod 75 relative to tubing 70. A helical compression spring 81 is coaxial with rod 75 and bears at one end against the lower end of tubing 70 and at its other end against collar 79. This spring normally and yieldingly urges rod 75 downwardly to the position shown in Fig. 10. It will be apparent that upon upward movement of rod 75, valve element 68 is moved to open position against the action of compression spring 72, thereby permitting flow of water through the valve and into conduit 39.

An L-bracket 82 has an arm 83 which is secured to the under side of partition 26. The depending part of this bracket is provided with an opening 84 which is formed in part by a horizontal lower element 85 and vertical elements 86 and 87. Lever 73, as best shown in Fig. 13, is provided with openings 88 and 89 and an edge notch 90. This lever is adapted to be mounted in bracket 82 so that bracket element 87 registers with notch 90 and horizontal element 85 serves as a fulcrum for the lever. The upper end portion of tubing 70 registers with lever opening 88.

A push button rod 91 has an actuating button 92 at its upper end. This button extends through the cabinet top and is slidable in dispenser D. Rod 91 extends through an opening 93 in partition 26 and through opening 89 in lever 73. The portion of the rod which is normally between partition 26 and lever 73 is flattened, as indicated at 94 in Fig. 10, to limit upward movement of that rod. The lower extremity of the rod is provided with a nut 95.

Actuating means A also includes a foot pedal 100 which consists of a foot engaging part 101 and an integral upwardly projecting toe stop 102. Secured to the under side of foot pedal part 101 is a pair of spaced arms 103 and 104. Each of these arms has an edge notch 105 (Fig. 16). Cabinet base front wall 106 has a pair of bayonet slots 107 and 108, each of which has a portion of enlarged width 109 (Fig. 17). Arms 103 and 104 are adapted to be inserted in slots 107 and 108 by being first introduced into the portions of enlarged width 108 and then moved so that the base edges register with arm notches 105 (Fig. 16). This assures proper positioning of the arms in the slots and permits the foot pedal to be pivoted with respect to the cabinet. There is provided a flexible rod 110 having bent end portions 111. Rod 110 is adapted to be mounted in the base front wall with its bent portions 111 in registry with slots 107 and 108, as shown in Fig. 17. When the flexible rod is in the illustrated position, it prevents accidental disengagement of the foot pedal from the cabinet.

When foot pedal 100 is properly installed, arm 103 projects under and beyond rod 75 and bears thereagainst. It will be apparent that downward foot pressure on pedal 100 causes the pedal to pivot in a clockwise direction (Fig. 9), thereby moving rod 75 and tubing 70 upwardly and causing the valve to be moved to open position against the action of spring 72.

Figure 18:
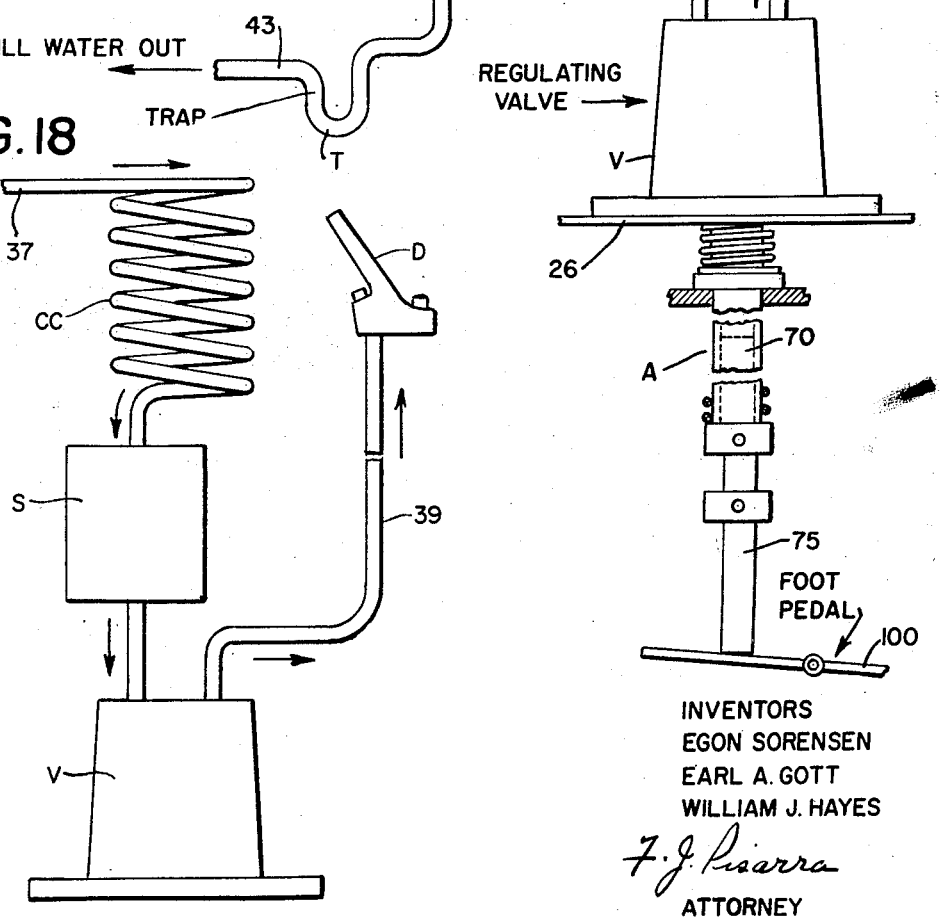
Fig. 18 is a view corresponding to a portion of Fig. 1 and is illustrative of another form of the invention.

Referring now to Fig. 18, we have illustrated therein a form of the invention wherein strainer S is in another relative position as compared to its location in Fig. 1. In Fig. 18, the strainer is interposed between and connected in series to cooling coil CC and regulating valve V, with the inlet of the strainer communicating with conduit 38 and the outlet of the strainer communicating with the inlet of the regulating valve. As in the case of the earlier described form of the invention, strainer S is mounted on rear panel 23 and is readily accessible from the back of the cabinet.

From the foregoing, it is believed that the objects, construction, operation and advantages of our present invention will be readily comprehended by persons skilled in the art, without further description. Although the invention has been herein shown and described in a simple and practicable form, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the following claims.

We claim:
1. In water dispensing equipment, a cabinet, a conduit for supplying water to the interior of the cabinet, a valve within the cabinet and having an inlet in communication with the conduit and an outlet, resilient means normally and yieldingly urging the valve into closed position, a water dispenser mounted on the cabinet and communicating with the valve outlet, first and second actuating means operable from the exterior of the cabinet for urging the valve to open position against the action of the resilient means, said first actuating means comprising a foot pedal positioned exterior of the cabinet, means pivotally connecting the foot pedal to the cabinet, an arm carried by the foot pedal and projecting into the cabinet, a rod slidable in the cabinet, said rod being engageable by the arm and connected to the valve, said arm being movable in one direction in response to pivotal movement of the foot pedal in a corresponding direction to actuate the valve to open position against the action of the resilient means, said second actuating means comprising a lever positioned within the housing and pivotal with respect thereto, one end of the lever engaging the resilient means, a second rod connected to the other end of the lever and extending through a wall of the cabinet, said second rod being operable from the exterior of the cabinet to effect pivotal movement of the lever and opening of the valve against the action of the resilient means.

2. Water dispensing equipment according to the claim 1 wherein the resilient means includes a tubular guide and wherein the rod is slidable in the guide, there being provided a spring which engages the guide and the rod and normally and yieldingly urges the foot pedal in a reverse direction about its pivotal connection with the cabinet.

3. In water dispensing equipment, a cabinet, a strainer comprising a housing carried by the cabinet and including a tubular side wall and an end wall, the end of the housing opposite the end wall being open, said housing having an inlet passage in one of said walls and an outlet passage in the other of said walls, removable means secured to and closing the open end of the housing, and a perforate tubular strainer element open at its ends, said strainer element being positioned in the housing with one end bearing against the housing end wall and communicating with one of the passages and the other end bearing against the removable means, a major portion of the strainer element defining an annular space with the inner surface of the housing side wall, the other passage communicating with the annular space, a conduit connected to the strainer inlet for supplying water thereto, means including a tubular member for altering the temperature of water admitted thereinto, said tubular member being mounted in the cabinet and having an inlet and an outlet, a conduit establishing communication between the strainer outlet and the tubular member inlet, a valve mounted in the cabinet and having an inlet and an outlet, a conduit establishing communication between the tubular member outlet and the valve inlet, means operable from the exterior of the cabinet for controlling flow of water through the valve, a water dispenser mounted on the cabinet, a conduit establishing communication between the valve outlet and the dispenser, a water trap carried by the cabinet and a conduit for transmitting water emitted from the dispenser to the trap.

4. In water dispensing equipment, a cabinet comprising a front wall, a pair spaced apart side walls extending rearwardly of the front wall and a back wall between the side walls and positioned forwardly of the rear edges of the side walls, said back wall and the rear portions of the side walls defining a recess, a strainer positioned in the cabinet and having an inlet and an outlet, a conduit connected to the strainer inlet for supplying water thereto, means including a tubular member for altering the temperature of water admitted thereinto, said tubular member being mounted in the cabinet and having an inlet and an outlet, a conduit establishing communication between the strainer outlet and the tubular member inlet, a valve mounted in the cabinet and having an inlet and an outlet, a conduit establishing communication between the tubular member outlet and the valve inlet, means operable from the exterior of the cabinet for controlling flow of water through the valve, a water dispenser mounted on the cabinet, a conduit establishing communication between the valve outlet and the dispenser, a water trap mounted on the housing rear wall and positioned substantially wholly in the recess, said trap comprising a U-tube, a first L-tube connected to one end of the U-tube and a second L-tube connected to the other end of the U-tube, and a conduit for transmitting water emitted from the dispenser to the first L-tube of the trap, said trap having its parts so arranged that the path of flow of water through the U-tube is in a plane which is substantially normal to the path of entry of water into the first L-tube and to the path of discharge of water from the second L-tube.

5. In water dispensing equipment, a cabinet, a strainer carried by the cabinet and having an inlet and an outlet, a conduit connected to the strainer inlet for supplying water thereto, means including a tubular member for altering the temperature of water admitted thereinto, said tubular member being mounted in the cabinet and having an inlet and an outlet, a conduit establishing communication between the strainer outlet and the tubular member inlet, a normally closed valve mounted in the cabinet and having an inlet and an outlet, a conduit establishing communication between the tubular member outlet and the valve inlet, actuating means operable from the exterior of the cabinet for controlling flow of water through the valve, said actuating means comprising a foot pedal positioned exterior of the cabinet, a pair of spaced arms carried by the foot pedal, said arms registering with corresponding slots in a wall of the cabinet and forming pivotal connection for the foot pedal relative to the cabinet, a rod slidable in the cabinet, said rod being engageable by one of the arms and connected to the valve, said rod being movable in one direction in response to corresponding pivotal movement of the foot pedal to actuate the valve to open position, a water dispenser mounted on the cabinet, a conduit establishing communication between the valve outlet and the dispenser, a water trap carried by the cabinet and a conduit for transmitting water emitted from the dispenser to the trap.

6. In water dispensing equipment, a cabinet comprising a front wall, a pair spaced apart side walls extending rearwardly of the front wall and a back wall between the side walls and positioned forwardly of the rear edges of the side walls, said back wall and the rear portions of the side walls defining a recess, a strainer positioned in the cabinet and comprising a housing including a tubular side wall and an end wall, the end of the housing opposite the end wall being open, said housing having an inlet passage in one of said walls and an outlet passage in the other of said walls, removable means secured to and closing the open end of the housing, and a perforate tubular strainer element open at its ends, said strainer element being positioned in the housing with one end bearing against the housing end wall and communicating with one of the passages and the other end bearing against the removable means, a major portion of the strainer element defining an annular space with the inner surface of the housing side wall, the other passage communicating with the annular space, a conduit connected to the strainer inlet for supplying water thereto, means including a tubular member for altering the temperature of water admitted thereinto, said tubular member being mounted in the cabinet and having an inlet and an outlet, a conduit establishing communication between the strainer outlet and the tubular member inlet, a valve mounted in the cabinet and having an inlet and an outlet, resilient means normally and yieldingly urging the valve into closed position, a conduit establishing communication between the tubular member outlet and the valve inlet, actuating means operable from the exterior of the cabinet for controlling flow of water through the valve, said actuating means comprising a foot pedal positioned exterior of the cabinet, a pair of spaced arms carried by the foot pedal, said arms registering with corresponding slots in a wall of the cabinet and forming a pivotal connection for the foot pedal relative to the cabinet, a rod slidable in the cabinet, said rod being engageable by one of the arms and connected to the valve, said rod being movable in one direction in response to corresponding pivotal movement of the foot pedal to actuate the valve to open position against the action of the resilient means, a water trap mounted on the housing rear wall and positioned substantially wholly in the recess, said trap comprising a U-tube, a first L-tube connected to one end of the U-tube and a second L-tube connected to the other end of the U-tube, and a conduit for transmitting water emitted from the dispenser to the first L-tube of the trap, said trap having its parts so arranged that the path of flow of water through the U-tube is in a plane which is substantially normal to the path of entry of water into the first L-tube and to the path of discharge of water from the second L-tube.

References Cited in the file of this patent

UNITED STATES PATENTS

| | | |
|---|---|---|
| 1,601,437 | Gustafson et al. | Sept. 28, 1926 |
| 1,720,610 | Sanford | July 9, 1929 |
| 1,940,923 | Stringer | Dec. 26, 1933 |
| 1,959,366 | Kellogg | May 22, 1934 |
| 2,512,961 | Morrison | June 27, 1950 |
| 2,623,367 | Morrison | Dec. 30, 1952 |
| 2,626,056 | Macro | Jan. 20, 1953 |
| 2,653,013 | Freer | Sept. 22, 1953 |
| 2,667,039 | Wehrwein | Jan. 26, 1954 |